United States Patent [19]
Mohr et al.

[11] Patent Number: 4,786,857
[45] Date of Patent: Nov. 22, 1988

[54] METHODS AND APPARATUS FOR TIME DOMAIN REFLECTOMETRY DETERMINATION OF RELATIVE PROPORTION, FLUID INVENTORY AND TURBULENCE

[75] Inventors: Charles L. Mohr, 1440 Agnes, Richland, Wash. 99352; Frederick R. Reich, Richland, Wash.

[73] Assignee: Charles L. Mohr, Richland, Wash.

[21] Appl. No.: 855,805

[22] Filed: Apr. 24, 1986

[51] Int. Cl.$^4$ ............................................. G01N 27/00
[52] U.S. Cl. ........................... 324/58.5 B; 324/58.5 R; 73/304 R
[58] Field of Search ............ 324/58.5 B, 58.5 R; 73/290 R, 292, 304 R; 364/551, 555

[56] References Cited
U.S. PATENT DOCUMENTS

| | | | |
|---|---|---|---|
| 3,424,002 | 1/1969 | Johnson | 73/290 |
| 3,474,337 | 10/1969 | Petrick | 324/58.5 |
| 3,572,119 | 3/1971 | Bak | 73/290 R |
| 3,626,284 | 12/1971 | Bak | 324/58.5 B |
| 3,695,107 | 10/1972 | Hertz | 73/290 R |
| 3,812,422 | 5/1974 | DeCarolis | 324/58.5 B |
| 3,832,900 | 9/1974 | Ross | 73/290 R |
| 3,853,005 | 12/1974 | Schendel | 73/290 R |
| 3,922,914 | 12/1975 | Fuchs | 324/58.5 X |
| 3,995,212 | 11/1976 | Ross | 324/58.5 |
| 4,135,397 | 1/1979 | Krake | 73/290 R |
| 4,170,135 | 10/1979 | Booman et al. | 73/290 R |
| 4,345,202 | 8/1982 | Nagy et al. | 324/58.5 B |
| 4,495,807 | 1/1985 | Field et al. | 73/290 R |
| 4,510,437 | 4/1985 | Iskander | 324/58.5 A X |

Primary Examiner—Reinhard J. Eisenzopf
Assistant Examiner—Jack B. Harvey
Attorney, Agent, or Firm—Wells, St. John & Roberts

[57] ABSTRACT

Methods and apparatus for determining the relative proportions of intermixed constituents of a multiphase fluid system. The constituents for which relative proportions are being measured must have measurably different electrical permittivities. The systems use at least one electrically conductive probe having two conductors which are spaced apart and capable of receiving the fluid system therebetween. Time domain reflectometers present a stimulating time varying electrical signal to the probes and receive and measure reflected signals generated at impedance changes in the transmission line and probe. The probe transit time and/or associated average probe velocity provide a measure of the fluid system conditions which can be compared to predetermined values corresponding to various relative proportions of the intermixed constituents. A measure of the relative portions of the constituents is thus provided. The variability of individual probe transit velocity data can be measured, analyzed and used to measure fluid system turbulence. Relevant data can also be interpolated, extrapolated and integrated to provide profiling of the fluid system conditions and a means of total system inventory of the constituents.

26 Claims, 4 Drawing Sheets

METHODS AND APPARATUS FOR TIME DOMAIN REFLECTOMETRY DETERMINATION OF RELATIVE PROPORTION, FLUID INVENTORY AND TURBULENCE

TECHNICAL FIELD

The technical field of this invention includes methods and apparatus for determining relative proportions and turbulence of multiple constituent fluid systems using reflected electrical signals and time domain reflectometry.

BACKGROUND

It has previously been known that the level of a liquid can be determined using time domain reflectometry. In such time domain reflectometry systems, electrical pulses are conveyed along a transmission line to an electrically conductive probe extending down or otherwise through the vapor-liquid interface at the liquid level. The electrical pulses are partially reflected at the liquid level due to a change in the electrical impedance of the probe caused by the difference in the dielectric strength or the corresponding complex electrical permittivity between a gas or vapor existing above the liquid and the liquid itself.

U.S. Pat. No. 3,424,002 to Johnson shows systems which are stated as useful in determining the levels of liquids or of fluid solids. The Johnson patent discloses electrical step generators having relatively rapid rise times for generating an identifiable pulse or change. The step signal is transmitted to a coaxial probe having a center conductor and an outer cylindrical sheath which is grounded to the step generating system. The outer probe sheath is connected at the distal end of the probe to the center conductor thereof through a terminating resistor. The systems explained by Johnson also have timing subsystems for determining the amount of time between initiation of the stepped electrical signal and the receipt of reflected electrical signals generated at the impedance changes existing at the interface between the two different materials. Johnson recognizes that foams or emulsified interfaces cause a gradual increase in impedance, see column 1, lines 55-58.

U.S. Pat. No. 3,474,337 to Petrick teaches systems for sensing levels and electrical characteristics of fluent materials. The Petrick systems use the same general time domain reflectometry concept as Johnson. Petrick indicates that time domain reflectometry can be used to determine the dielectric constant and composition of a material having a fixed level.

U.S. Pat. No. 3,922,914 to Fuchs describes a bed level monitor designed for use in vessels containing dry products which are fluidized. The Fuchs systems are useful for sensing the level of fluidized or non-fluidized beds using a full length electrode which experiences reflected electrical signals at points of discontinuity such as the electrode terminal, the fluid bed level, and the end of the electrode. Fuchs mentions that gas bubbles cause irregularity in the time domain reflectometry (TDR) traces but fails to ascribe any particular significance or further usable information which can be extracted therefrom.

The prior art systems described above are concerned with recognizing interfaces occurring at relatively well defined liquid-gas, solid-gas, and liquid-liquid interfaces. Although such systems have been found useful for measuring such well defined interfaces they have not been found useful in systems such as boiling water nuclear reactors where there may not be a well defined interface at which the vapor and liquid phases meet. This is particularly important in the nuclear industry since high power output conditions can cause boiling or frothing conditions to occur over most, if not the entire depth of the reaction vessel. Under high output or meltdown conditions such as experienced at Three Mile Island, no such detectable level exists. Computerized control systems may malfunction if based upon prior art systems which require detection of a discernible portion of the reflected electrical signal pulse, such as caused by a definite change in impedance at a typical liquid-gas interface. Prior art time domain reflectometry liquid level detection systems are accordingly almost useless under such conditions and cannot be used to assure proper monitoring of the system over a wide range of boiling conditions.

Prior art TDR fluid level detection systems are also limited in that they have failed to provide an indication of total vessel liquid coolant inventory under boiling or frothing conditions. Such an inability to accurately monitor system coolant inventory increases the risk that loss of cooling water or other fluid will not be detected sufficiently early to prevent damage to the system. Such a limitation can be vitally important in nuclear reactors since key system operating parameters may not be capable of rapid adjustment in order to compensate for low cooling water inventory, particularly during times of high power output. A failure or catastrophe may occur as a result.

Prior art systems have also been limited by the requirement that the electrode or other probe extend downwardly from the terminal end in order to experience a relatively lower impedance to higher impedance interface. This arrangement may not be convenient in all applications. This prior art orientation has also been used to avoid the relatively greater attenuation which typically occurs in the denser material as compared to the overlying gas or other fluid.

Prior art time domain reflectometry fluid level detection systems have also implicitly required the influence of gravity or a similar force to concentrate the denser fluid or material for measurement. In space, such a gravitating influence typically will not exist for measurement of fluid systems. Fluid systems containing gaseous and liquid phases are commonly used in space vehicles. The phases are typically intermixed and non-homogeneously distributed within a vessel depending upon the various acceleration and gravitational forces acting thereon. The non-homogeneous distribution of the phases makes it difficult to accurately assess the mass contained in the vessel using prior art systems. Systems and methods using the present invention provide a means for determining fluid system inventory under such difficult conditions.

Prior art time domain reflectometry liquid level detection systems have also failed to provide methods or means for measuring turbulence of a fluid system. Turbulence can be an important process control variable in the nuclear industry, chemical process industries, and in other applications.

SUMMARY OF THE INVENTION

The present invention provides methods and systems which are specifically designed to provide information indicative of the relative proportions of intermixed, non-homogenous system constituents or phases. The present invention further teaches systems and methods which are useful at determining total vessel fluid inventory under wildly fluctuating and erratic conditions such as frothing and boiling. This invention further teaches systems and methods for determining and providing a measure of turbulence in a multiple phase fluid system.

BRIEF DESCRIPTION OF THE DRAWINGS

Preferred embodiments of the invention are illustrated in the drawings in which.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Figure 1:
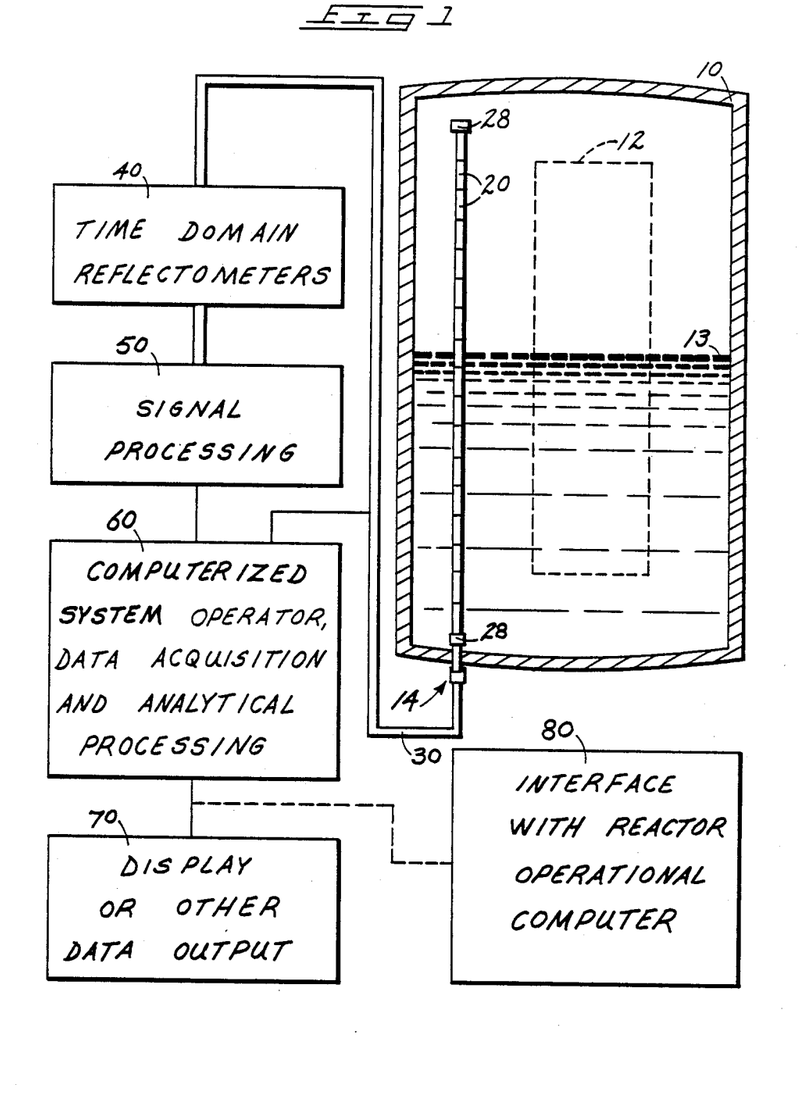
FIG. 1 is a schematic view of a system for determining the relative proportions and turbulence of liquid and vapor in a boiling water reactor.

FIG. 1 schematically shows a preferred system according to this invention for determining relative proportions of constituents contained in a multiphase fluid system. Vessel 10 symbolizes a nuclear reactor vessel. The core 12 of the reactor generates large amounts of heat in the well known manner. The proportion of vapor phase versus liquid phase of cooling water contained in reactor 10 is dependent upon the heat output of core 12. Under relatively cool or low heat output conditions there may be a defined liquid level such as shown at 13. However, large output of heat from core 12 causes extensive large scale boiling and possibly frothing conditions to exist. These two phase mixtures of water vapor and liquid water are non-homogeneous, varying from the top to the bottom of vessel 10 due to the density difference, and varying across the reactor because of dynamic variations in the fluid system and reactor flux variations. Under extreme heat output conditions the entire volume of reaction vessel 10 may contain a two-phase mixture of reactor cooling water and steam derived therefrom, along with any other intentional or unintentional additives or contaminant constituents. Under such conditions there is no defined fluid level, and the total amount of water present in the reactor must be considered based upon the amount contained in the intermixed, non-homogeneous multiphase mixture filling the volume. It is also possible to consider the spatial coolant inventory distribution as a system variable in addition or as an alternative to total system coolant inventory.

The system shown in FIG. 1 includes a plurality of electrically conductive probes 20 which are positioned at desired measurement points within the interior of vessel 10. Probes 20 are essentially independent sensors which can be positioned anywhere within vessel 10 at locations where measurements are desired. FIG. 1 shows probes 20 arranged in a vertical array either using a supporting structure (not shown) or wherein the probes are specially adapted and interconnected together for support. Probes 20 could alternatively be positioned in a circular array about the reactor core at either single or multiple levels. Many other possible mounting configurations and array geometries are possible dependent upon the fluid system being measured and the accuracy required.

Figure 2A:
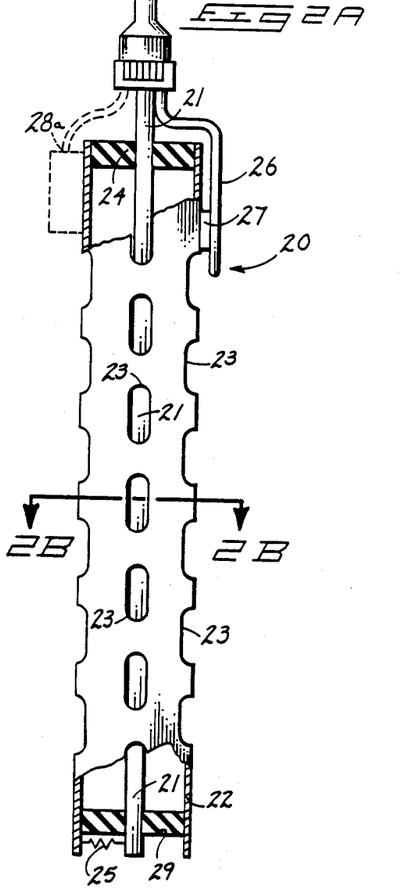
FIG. 2A is a side elevational view of a preferred probe useful in systems of this invention, such as shown in FIG. 1; portions have been broken away and shown in sectional view.
Figure 2B:
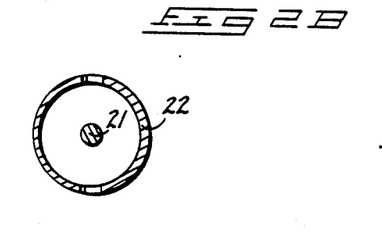
FIG. 2B is a cross-sectional view taken along line 2B—2B of FIG. 2A.

A preferred embodiment probe 20 is shown in greater detail in FIGS. 2A and 2B. Probe 20 includes a central or first electrode 21. A second electrode, such as cylindrical sheath 22 is spaced apart from electrode 21 and can be coaxially arranged about central conductor 21 in order to minimize interference from outside electrical fields. Electrodes 21 and 22 can be constructed from a variety of electrically conductive materials depending on the conditions under which they will operate. Sheath 22 is advantageously provided with a plurality of longitudinal slots 23 which extend transversely through the wall of sheath 22 in order to assure representative communication of the surrounding multiphase fluid conditions into the annular space between central conductor 21 and sheath 22.

A dielectric insulator 24 is provided at a first or proximate end of probe 20 for electrically separating and mechanically connecting first and second electrodes 21 and 22. A further dielectric insulator 29 is used to electrically separate and mechanically connect electrodes 21 and 22 at the second or distal end of probe 20. Probe 20 also advantageously includes a terminating resistor 25 (shown schematically) near the distal end 26 of probe 20. Terminating resistor 25 extends between central conductor 21 and sheath 22. Alternatively, the first and second electrodes can be left electrically isolated throughout their entire lengths. Terminating resistor 25 is sized to provide an identifiable impedance change at the distal end of probe 20.

It has been found desirable to construct probes 20 with the following specification when used in a water-steam system. The overall probe length is preferably relatively short as compared to the overall system size in order to give proper resolution and allow good reflected signal strength. A length of 12 inches (30.4 cm) has been found desirable. It has been found advantageous to construct the central electrode from stainless steel rods having diameters of 0.082 inches and 0.250 inches (0.208 cm and 0.63 cm). Stainless steel tubes having outside diameters of 0.250 (0.635 cm) and 0.75 inches (1.90 cm), and wall thicknesses of approximately 0.06 inches (0.15 cm) have been found acceptable for the central conductors of 0.082 inches and 0.250 inches, respectively. Slots having a width of 0.25 inches (0.635 cm) and a length of 1 inch (2.54 cm) have been found useful as slots 23 for either size just specified.

The ratio of the central electrode diameter to the inside diameter of the surrounding tubes determines the impedance of the probe. The diameters and other specifics given above were chosen to produce an optimum impedance for water and the connecting cable 30. Smaller sizes and other alternative sizes and proportions of probes 20 are clearly possible consistent with this invention. Proportions of probes 20 are selected based on the observed impedance of the transmission lines 30 and the observed propagation velocities of the probe in the intended system in order to provide optimum resolution of the probe transit time measurements. Other alternative probe configurations such as parallel plates or parallel tubes are also clearly possible.

Probes 20 also preferably include thermocouples or other temperature sensing devices 26. Thermocouples 26 can be connected to the exterior of sheaths 22 using a suitable mounting structure such as bracket 27. Temperature sensors 26 allow measurement of the ambient temperatures at each probe 20. Predetermined information indicating electrical permittivity as a function of temperature can then be used to more accurately interpret measured probe transit times or probe transit velocity as will be more fully explained hereinafter.

Vessel 10 can also be provided with suitable pressure sensing devices such as pressure transducers 28 at the top and bottom thereof (see FIG. 1). Alternatively, probes 20 can be fitted with suitable individual pressure transducers 28a (shown in phantom in FIG. 2) to more accurately measure the pressure existing at each individual probe. Pressure information gathered by transducers 28 allow predetermined data of electrical permittivities as a function of pressure to be interpreted to provide an accurate indication of the relative proportions of the fluid system constituents existing at each probe.

FIG. 1 shows a transmission cable 30 which is connected to the plurality of probes 20 via a bottom vessel access port 14. Cable 30 preferably includes a plurality of conductive wires which are individually connected to central conductors 21 of probes 20. A common or individual ground wires can be connected to the respective sheaths 22 of probes 20. Conductive wires within cable 30 are also preferably connected to thermocouples 26 to provide data indicative of the temperature at each probe 20. Further conductive wires within cable 30 are also preferably connected to either or both types of pressure sensors 28 so that data indicating pressure is also collected. Further types of sensors (not shown) can also be used to collect data on system parameters which cause electrical permittivity to vary.

The system of FIG. 1 further includes suitable AC or DC coupled time domain reflectometers 40. FIG. 1 shows a preferred form of the invention in which each probe 20 has a dedicated time domain reflectometer (TDR) connected thereto by cable 30. Each dedicated reflectometer supplies stimulating electrical signals to its associated probe 20. The intensity of reflected signals occurring at impedance changes along cable 30 and along probe 20 can be determined in the well-known manner of time domain reflectometers. Time domain reflectometers can operate under a variety of regimes such as by sampling at progressively delayed time intervals. Alternative TDR techniques can also be used.

Reflectometers 40 preferably are constructed to provide a digital output indicating the reflected signal strength as a function of round-trip signal transit time. Alternatively, reflectometers 40 can provide an analog signal output which can be displayed and/or converted into a digital representation thereof using a suitable digitizing systems well known in the art, which can be part of or distinct from signal processing subsystems 50.

The outputs from time domain reflectometers 40 are connected to suitable signal processing unit or units 50 which can be of a variety of types. Signal processing units 50 are constructed to allow the output from time domain reflectometers 40 to be communicated to a suitable dedicated computer or computers 60. Computer 60 is adapted to store information obtained from probes 20 along with any desired temperature and/or pressure data, as required by the properties of the fluid system over the operating ranges of the fluid system. Computer 60 can be programmed using a variety of programs to automatically record and analyze data from time domain reflectometers 40. The information is used to give a reliable indication of the conditions existing adjacent to each probe 20, as will be explained more fully hereinafter.

Computer 60 can be provided with a visual display or other suitable data output device 70 such as a printer or plotter as is well known in the art. Computer 60 can also be connected to a suitable interface subsystem 80 for inputting some or all of the derived data into a centralized reactor operational computer (not shown). Interface 80 can also be used to connect alternative data processing apparatus to the system such as for long term data storage or alternative analysis.

The manner of using the system of FIG. 1 will now be more fully described. A principal use of this system is to determine the relative proportions of water and steam contained in the fluid system at each probe location. Similar alternative embodiment systems can be used to monitor or measure the relative proportions of at least two variably proportioned, intermixed constituents. The intermixed constituents are herein referred to as different phases of a multiphase fluid system. The term multiphase as used herein is not limited to systems having two different phases selected from gas, liquid or solid. As indicated above, the intermixed phases can be from either similar or distinctive gaseous, liquid, or solid forms. It is necessary that the intermixed constituents for which relative proportions are being determined, have measurably different electrical permittivities within the relevant system operating range.

The electrically conductive probes 20 are appropriately located partially or wholly within the fluid system. Electrical pulses, step changes in voltage or other time varying electrical signals, are generated by each time domain reflectometer 40. The time varying signals from each reflectometer are transmitted via conductors in cable 30 to the associated probe 20. The conductors of cable 30 are shielded and have a characteristic impedance which is preferably different from the impedance of the probe when operating under normal conditions so that an identifiable change in impedance can be detected at the proximate end of the probe. The point of electrical connection of probe 20 usually involves a suitable plug or other connection terminal. Such point of connection typically also causes a significant reflected signal to be generated. This prominent and easily recognized reflected signal is used as a reference point in analyzing variations in the transit times along the probe. However, it is an objective to minimize the impedance mismatch at this point.

Figure 4:
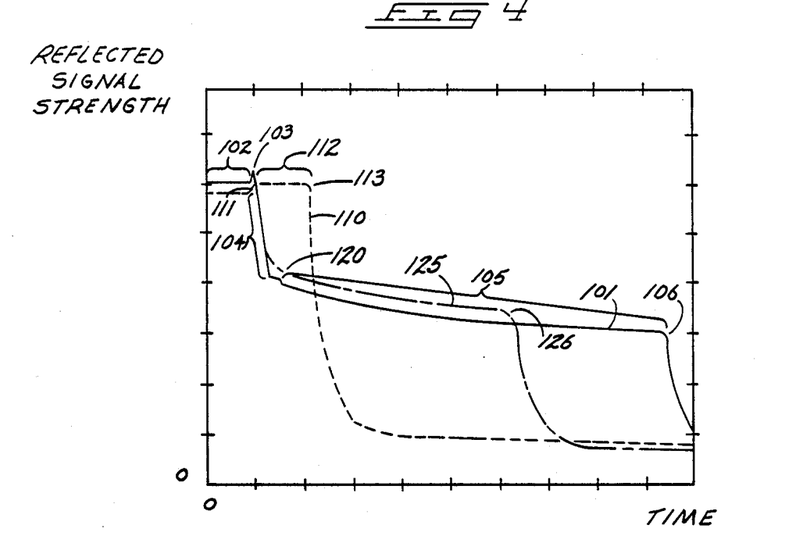
FIG. 4 is a graph showing exemplary time domain reflectometry traces for three different proportions, using systems of the invention.

FIG. 4 shows typical oscilloscopes traces from time domain reflectometers 40 under three different probe environments. Curve 101 shows the level of reflected signal strength as a function of total round-trip signal transit time for a probe submerged in 100% liquid water. Curve 101 includes a transmission portion 102 which is relatively flat and is the portion of the curve representing transmission and return of the TDR signals wholly within the conductors of cable 30. Point 103 occurs immediately after transmission portion 102 and is associated with the increased reflected signal strength caused by an impedance change at the connection and proximate end of probe 20. Point 103 provides a reoccurring reference point against which probe transit times can easily be measured. Total system transit time can alternatively be used.

Immediately after peak 103 is an initial decline portion 104. Portion 104 is a transition zone which represents the length of probe between the probe connection and the portion of the probe covered with water. The initial decline is followed by a transit slope portion 105 associated with the relatively slower velocity of the electrical signal through first electrode 21 when the void between the first and second electrodes is filled with the ambient fluid system conditions, e.g. 100% water.

The next characteristic point shown on curve 101 is the final knee or drop point 106 which shows the decrease in reflected signal strength occurring as a result of the signal reaching terminating resistor 25. In this case, the impedance of the terminating resistor is less then the impedance of the water. The resistance value of resistor 25 is chosen to optimize the signal response at the distal end of the probe under typical operating conditions, such as immersed under water.

The probe round-trip transit time is indicated by the time between peak 103 and drop off point 106. The actual measured round-trip probe transit time indicated on the horizontal axis of FIG. 4 is two times the single pass probe transit time because the time domain reflectometers 40 measure time between sending of a stimulating signal and receipt of the reflecte signal generated therefrom. This involves traveling the same electrical path twice in going from the time domain reflectometer to the point of reflection and back to the time domain reflectometer.

FIG. 4 also shows curve 110 which shows a typical oscilloscope trace for probe 20 immersed in a fluid system consisting of 100% steam (gaseous water). Rise 111 indicates the proximate end of first electrode 21 which is similarly indicated by peak 103 in the 100% water environment. These signal points are due to impedance mismatches between the cable and probe, and are not necessary for the functioning of this measurement concept. Plateau portion 112 represents the probe transit portion of curve 110. Knee or drop off point 113 indicates the arrival of the stimulating signal at terminating resistor 25. The time it takes the stimulating signal and reflected signal to transit the probe is indicated by the horizontal separation between rise 111 and knee 113.

FIG. 4 further shows a curve 120 which exemplifies a time domain reflectometer oscilloscope trace for a probe 20 immersed in a fluid system having two principal constituents or phases, water and steam. Curve 120 reflects relative steam water proportions of approximately 35% water and 65% steam. This proportional relationship can alternatively be indicated as a density ratio equal to the actual density of the fluid system over the theoretical maximum when the system is 100% water. In this case, the relative proportions listed above correspond to a density ratio of 0.35.

Curve 120 is approximately coincident with transmission portion 102, peak 103, and initial decline 104 of curve 101. The transit slope portion 125 of curve 120 is slightly higher than transit slope portion 105 of curve 101. The knee 126 of curve 120 is nearer in time to peak 103 versus knee 106 because of the relatively faster transit time associated with the lower permittivity of the steam/water mixture as compared to water. The round-trip time period between peak 103 and knee 126 or an associated one way probe transit time is used to characterize the relative proportion of the two intermixed phases contained in the system serving as the probe environment for curve 120. It is also advantageous to characterize the intermixed constituents by calculating the average probe transit velocity. The average probe transit velocity is equal to twice the probe length divided by the round-trip probe transit time.

The correlation of probe transit times or probe velocity to relative phase proportions is preferably done by experimentally establishing predetermined transit times or velocities using similar or the same probes under controlled conditions having known proportions of the respective intermixed phases. This can be done using a test chamber or the actual fluid system depending upon the ability to provide controlled conditions against which the predetermined calibration values can be measured. Future experimental work may also allow mathematical expressions or formula to be developed for relating the phase proportion to the measured times or velocities. A simple calibration step correcting for each probe may be appropriate in either approach.

Figure 5:
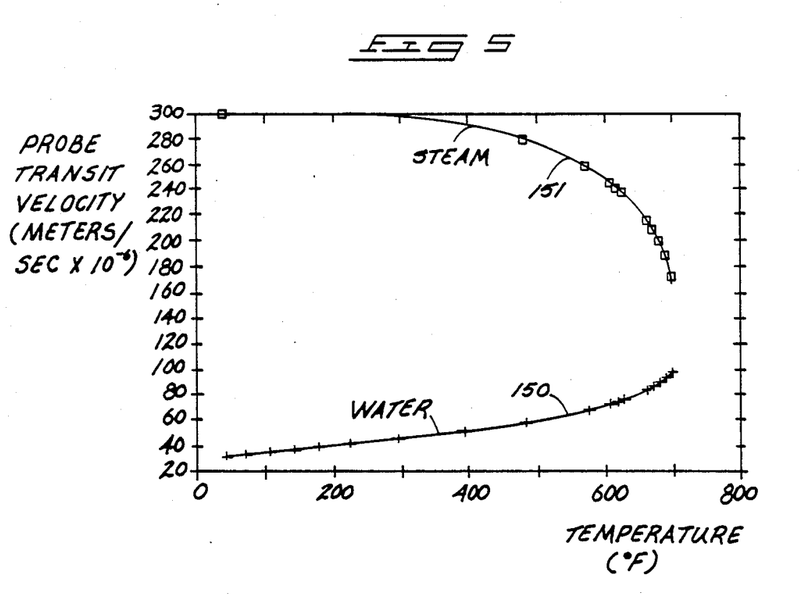
FIG. 5 is a graph showing approximate velocity of a TDR signal along a probe for water and steam as a function of temperature.

Characterization or calibration of probe transit times or velocities to varying phase proportions is in many cases a function of temperature and pressure. FIG. 5 shows a graph indicating theoretical probe transit velocities as a function of temperature for water (curve 150) and for steam (curve 151). The theoretical probe velocities shown in FIG. 5 are calculated based upon experimentally derived values for the electrical permittivity of water and saturated steam at the indicated temperatures.

Changes in pressure have also been found to be significant to the probe signal velocity which determines the associated probe transit time. Other system parameters such as the concentration of constituents having relatively stable proportions can also be measured using suitable sensing equipment and compensation can be made via computer 60 using appropriate analytical software.

The output from time domain reflectometers 40 is preferably in digital format indicating reflected signal strength as a function of reflected signal delay time and strength. In such a construction, a signal processing unit 50 would be used to digitally condition the output data to provide better signals for analysis by computer 60, such as by digitally filtering the output to eliminate spikes. Alternatively, signal processing units 50 can be constructed to take analog output signals from time domain reflectometers 40 and digitally encode and condition the digital signals for use by computer 60.

The conditioned digital signals are then input to computer 60 which preferably acts as a system control, data acquisition unit, and analytical processing unit to analyze the signals and automatically derive the relevant indicators such as probe total transit time and velocity. Computer 60 advantageously includes suitable software effective at recognizing the peak 103 or rise 111. The computer is further programmed to measure the total round-trip signal transit time associated with the peak or rise, thus effectively establishing the time of arrival for the electrical pulses. The use of a digital signal makes it possible to characterize the shape of the digitized trace and correlate it with specific coolant conditions based on experiment.

The computer software is further preferably programmed to discern the drop off points 106, 113, and 126 so that the total round-trip probe transit time can also be automatically determined. Computer 60 can further calculate the difference between the round-trip transit times from the proximate and versus the distal end of the probe thus providing a measure of the round-trip probe transit time. The round-trip probe transit time can be divided by the round-trip distance to provide the average velocity along the probe. This average velocity or the probe transit time can be compared by computer 60 to predetermined, preprogrammed values for velocity or transit times as a function of relative proportion, for the particular temperature and pressure existing at the probe in question. The computer thus derives an estimate of the relative proportions of the intermixed, variable proportioned phases at each individual probe.

It should be further indicated that slope as a function of time is an equally important parameter, and the computer with the digitized signals can also be used to analyze slope of the output signal to develop density ratios and fractions of coolant using empirical methods. The digital signal from 111 to 126, including slope and drop point 126, all as a function of time and correlated with experiment provide the relationships for determining density ratio, turbulence, and the type of medium (froth, foam, or solid coolant under turbulent conditions). The evaluation of particulate fractions in a primarily liquid system requires comparisons of the reflected signal shape subtracted from or compared against a reference signal shape. All comparisons are based on experimental correlations of the probe in the medium of interest.

The estimate of relative phase proportion for each probe 20 can also be combined together to provide a phase profile using suitable software programmed into computer 60. The software can be written to interpolate and extrapolate from the plurality of probe measurements to produce the estimated profile of phase proportion. For example, the vessel 10 of FIG. 1 may vary from all water at near the bottom to totally steam at the top. In between, the relative proportions of steam and water may vary non-linearly. The computer can provide suitable display or other output showing the proportion profile existing vertically within vessel 10.

Computer 60 can further be programmed to integrate the phase proportion profile data to produce a measure of total system inventory of water. This measure is particularly important for identifying significant leaks from the system, estimating coolant resources, or to otherwise warn of low cooling capacity. In chemical process systems, liquid inventory can also be used as a significant operational control parameter which may be relevant to the quality or rate of output from the system. Computer 60 can further be used to determine other relevant system conditions, one of which is explained more fully below. The data obtained can also be used to indicate the effect of operational parameters upon system performance and damage which may result therefrom. By using this instrument in a process control situation, the time history of the signal can be an indicator of the completion of a chemical reaction or to mark the arrival of fluid or suspension of a different type. All of which would require the comparison of the digital signal from the reference to the current measured value.

Figure 3:
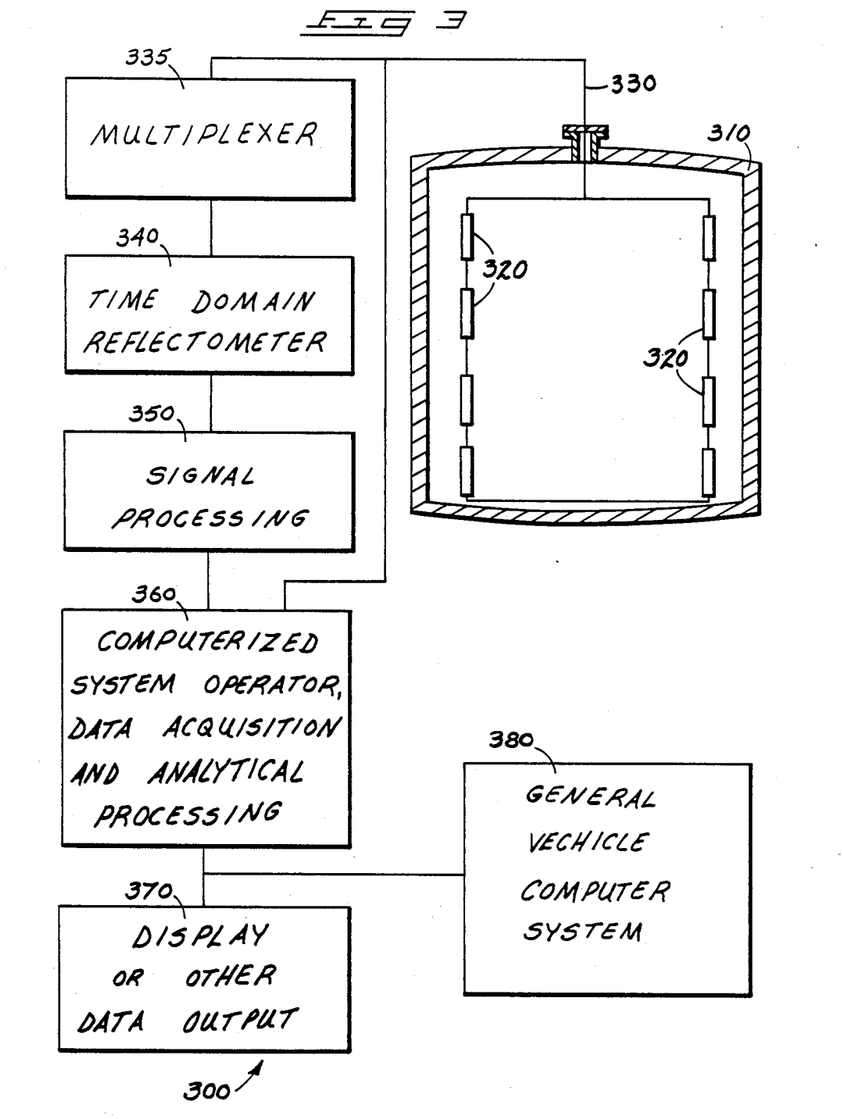
FIG. 3 is a schematic view of an alternative system for determining relative proportions and fluid inventory according to this invention.

FIG. 3 shows an alternative embodiment system 300 according to this invention. System 300 includes a storage vessel 310 which can be used in any application, but which is assumed useful in a space vehicle (not shown).

Vessel 310 can, for example, be useful for holding a non-homogeneous mixture of liquid oxygen and gaseous oxygen. The lack of consistently oriented gravitating forces requires that the approximate proportion of gas versus liquid be ascertained at a plurality of points so that the total amount of oxygen in the system can be estimated.

Vessel 310 has a plurality of two electrode probes 320 arranged therein in a desired array. The array is preferably designed to effectively require an equal weighting from each probe in an equation to determine total vessel inventory of oxygen. A cable 330 has a plurality of shielded conductors individually connected with each probe 320. Cable 330 is also connected to a suitable high speed multiplexer 335 which transmits time varying stimulating electrical signals from time domain reflectometer 340 to probes 320. Multiplexer 335 also allows reflected signals to be communicated back to reflectometer 340 so that complete time domain reflectometry scans can be performed for each probe.

A suitable signal processing subsystem 350 is connected between TDR 340 and computer 360, as needed for the particular system components being used. Computer 360 functions substantially as described above with respect to computer 60. A suitable display or other output device 370 can also be connected to computer 360. Computer 360 can also advantageously be connected to the general space vehicle computer system for monitoring.

The system of FIG. 3 operates substantially as just described with respect to the system of FIG. 1. The principal difference is the use of a single time domain reflectometer 340 and a multiplexer 335 which allows the time domain reflectometer to sample each of the plurality of probes in a systematic way without replicating the cost of multiple time domain reflectometer units.

The invention further includes methods and apparatus for determining turbulence of a multiphase fluid system containing constituents having different electrical permittivities. FIG. 1 shows a system which can be used to determine the turbulence of the fluid system contained within vessel 10. The system for determining turbulence is constructed as described above. Apparatuses according to this invention further include means for recording data indicative of a plurality of probe transit time periods or average probe transit velocities. Such measurements vary with time. The amount of variance has further been found to be indicative of the fluid system turbulence. Such a means is conveniently accomplished using computer 60 and appropriate software and memory capacity to isolate and store such information for each probe as a function of time.

The apparatus for determining turbulence further includes means for identifying variations in the data indicative of probe transit time and average probe transit velocity. Such a means is conveniently accomplished using computer 60 and appropriate analytical software which processes the data indicating probe transit velocities and probe transit times as a function of time to determine a suitable measure of the variability of such information with time. A suitable analytical program may use the standard deviation of the probe transit velocity measurements over a relevant period of time such as 1 second to 5 minutes. A statistically significant number of measurements should be performed during the relevant period. The resulting measure of variability provides a measure of the level of turbulence in the fluid system.

Alternative programs for determining and measuring variability of the data indicating probe transit times and velocity are clearly possible. One such alternative program involves accepting digitally encoded data indicating the various points included in each TDR scan. Such data is then input into a Fourier transform analysis to determine the variability. Analysis of the data through a Fourier transform allows characteristic frequencies of variation to be identified, thus providing possible multidimensional analysis based upon spectral densities of the variations in average probe transit times and velocity. For example, in a particular fluid system it might be found that the variability in probe transit velocities may tend to occur at a frequency of about 20 Hz when a particular type of boiling is occurring, such as during startup of reactor vessel 10. At later times when operation is established at a constant level of heat output, the frequency of variability may be different, for example 10 Hz. Such information may be useful in monitoring the operation of the particular fluid system involved.

The invention further includes methods for determining turbulence of a multiphase fluid system. Such methods involve appropriately placing at least one electrically conductive probe within relevant portions of the multiphase fluid system being measured. Time varying stimulating electrical signals are generated and transmitted to a proximate end of the probes. TDR's 40 then detect reflected electrical signals generated at impedance changes associated with known points along the probe such as at the proximate end and at the distal end as explained hereinabove. The method further involves determining probe transit time periods for a known transit distance. Equally applicable is the average probe transit velocity over the portion or length of the probe which is characterized in the TDR signal. The probe transit velocity allows the effective electrical permittivity over the relevant portion of the probe to be determined either explicitly or implicitly in the actual measured data.

Turbulence, or the type or form of a two-phase mixture, is determined by the angle or slope of the curve 120. High turbulence will result in a rapid change in point 126, resulting in a time averaged effective density ratio. A high or rather sharp slope that is stable with little motion of point 126 with time is indicative of low turbulence and a fine foam or bubbly froth. Both conditions can have identical time averaged relative density conditions.

The method further includes recording data indicating a plurality of probe transit velocity measurements taken over time. The plurality of probe transit velocity measurements over time are then analyzed to identify variations in the probe transit velocity over a relatively limited period of time such as between approximately 1 second to 5 minutes or more depending on the fluid system and the rate of dynamic movement therein. The variations are quantitatively analyzed to produce a measure of the level of turbulence. The measure of turbulence can be compared to predicted or experimentally predetermined data indicative of system turbulence. Such level of turbulence clearly will vary with time and can be used as an operational parameter in control of the fluid systems. The turbulence data can also be used to develop turbulence profiles for systems using a plurality of probes.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A method for measuring the relative proportions of two intermixed constituents having dynamically varying relative proportions which do not have a defined fluid level interface and having different electrical permittivities contained within an intermixed multiphase fluid system, comprising:
   placing a plurality of relatively small electrically conductive probes within relevant portions of the intermixed multiphase fluid system so as to provide numerous probes each providing an indication of relative proportions at numerous distinct points within the fluid system;
   generating time varying stimulating electrical signals;
   transmitting said stimulating electrical signals to said probes;
   detecting reflected electrical signals generated from the stimulating electrical signals along the probes;
   transmitting said stimulating electrical signals to grounded points on said probes;
   determining approximate probe transit time periods associated with measured time the stimulating electrical signals take to traverse along said probes;
   measuring temperature so as to provide estimates of temperatures at the plurality of probes;
   comparing data indicative of probe transit time periods with predetermined data associating probe transit time periods with relative proportions of intermixed constituents as a function of varying probe temperatures, to provide a measure of the approximate relative proportions of the intermixed variable constituents contained in the fluid system adjacent the probes.

2. The method of claim 1 where said measurements of relative proportions are extrapolated to derive a composite profile approximating relative proportions over portions of the multiphase fluid system beyond the probes.

3. The method of claim 1 further comprising:
   recording a plurality of propagation time difference periods occurring over time from the same probe;
   identifying variations in the propagation time difference periods over time;
   deriving a measure of the level of turbulence from the identified variations in the propagation time difference periods.

4. The method of claim 1 wherein the multiphase fluid system is a water-water vapor system.

5. The method of claim 1 wherein the multiphase fluid system is a nuclear reactor having water and water vapor therein, and wherein the method is applied to a plurality of probes.

6. An electrical proportion measuring apparatus for quantitatively determining relative proportions of dynamically varying intermixed constituents having different electrical permittivities contained in a multiphase fluid system, comprising:
   means for generating time varying stimulating electrical signals;
   at least one electrically conductive probe means having first and second ends; which are spaced along the probe means; said probe means being less than approximately 12 inches (30 centimeters) between said first and second ends to define a limited sample zone thereabout within the fluid system; said first end being adapted to be electrically connected to said means for generating time varying stimulating electrical signals; said probe means having a first conductor and a second conductor spaced from said first conductor; said probe means being adapted for mounting substantially within said multiphase fluid system;

means for detecting and measuring reflected electrical signals generated from said stimulating electrical signals at impedance changes along said probe means;

means for analyzing reflected electrical signals to deduce approximate probe transit time periods associated with time differences between receipt of first reflected electrical signals generated as stimulating electrical signals pass through the first end, and receipt of second reflected electrical signals generated as stimulating electrical signals pass through the second end;

means for measuring temperature at said probe means to provide probe temperature data;

means for comparing data derived from probe transit time periods and probe temperature data against predetermined data associating probe transit time periods with relative proportions of variable, intermixed constituents as a function of varying probe temperatures to derive a measure of relative proportions;

output means for providing an indication of the measure of relative proportions of the variable, intermixed constituents of the multiphase fluid system.

7. The apparatus of claim 6 wherein there are a plurality of probe means arranged in a spatial array substantially within the multiphase fluid system to provide information of the relative proportions of the variable, intermixed constituents over a desired range of locations within the fluid system.

8. The apparatus of claim 7 wherein the probe means are all entirely within the multiphase fluid system.

9. The apparatus of claim 7 further comprising means for integrating measurements of relative proportions into a fluid system profile.

10. The apparatus of claim 6 further comprising:
means for recording a plurality of probe transit time periods occurring over time from the same probe;
means for identifying variations in the probe transit time periods over time; and
means for deriving a measure of the variability of probe transit time periods over time to produce a measure of the level of turbulence experienced by the probe.

11. The apparatus of claim 10 further comprising means for comparing said measure of the variability of probe transit time periods against predetermined data associating measures of variability with turbulence of the multiphase fluid system.

12. An apparatus for measuring turbulence of a multiphase fluid system containing dynamically variable, intermixed constituents having different electrical permittivities, comprising:
means for generating time varying stimulating electrical signals;
at least one electrically conductive probe means having spaced first and second ends; said first end being adapted to be electrically connected to said means for generating time varying stimulating electrical signals; said probe means having a first conductor and a second conductor spaced from said first conductor;
means for detecting reflected electrical signals generated from said stimulating electrical signals at impedance changes along said probe means;
means for measuring approximate probe transit time periods associated with time differences between receipt of first reflected electrical signals generated as stimulating electrical signals pass through a first point of reflection near said first end, and receipt of second reflected electrical signals generated as stimulating electrical signals pass through a second point of reflection near said second end;
means for recording a plurality of probe transit time periods over time;
means for identifying variations in the duration of probe transit time periods over time; and
means for deriving a measure of the variability of probe transit time periods over time to produce a measure of the level of turbulence experienced about the probe.

13. The apparatus of claim 12 wherein there are a plurality of probe means.

14. The apparatus of claim 13 further comprising means for integrating measures of the level of turbulence experienced about the plurality of probes to provide a composite turbulence profile.

15. A method for quantitatively determining turbulence of a multiphase fluid system containing intermixed constituents having dynamically variable relative proportions and different electrical permittivities, comprising:
placing at least one electrically conductive probe within relevant portions of the multiphase fluid system; said probe having spaced first and second ends;
generating time varying stimulating electrical signals;
transmitting said stimulating electrical signals to the probe;
detecting reflected electrical signals generated from the stimulating electrical signals along the probe;
determining approximate probe transit time periods defined by the time used by the stimulating electrical signals to transit between the spaced first and second ends of the probe;
recording a plurality of data indicative of probe transit time periods over time;
identifying variations in the data indicative of probe transit time periods over time;
deriving a measure of the level of turbulence from the identified variations in the probe transit time periods.

16. The method of claim 15 wherein identifying variations in the probe transit time periods involves performing a Fourier transform of probe transit time periods over time to determine spectral power density thereof.

17. A nuclear reactor water monitoring system for providing an accurate quantitative measure of the relative proportions of water and steam, comprising:
a plurality of relatively small electrical probes having first electrodes which are grounded near a distal end using a resistance means; said plurality of probes being arranged in a spaced array within the nuclear reactor to detect electrical properties of the reactor contents at a plurality of locations therewithin;

at least one pulse generator connected to supply stimulating pulses of electrical energy to and along said first electrodes;

means for detecting reflected electrical waves generated by said stimulating pulses;

means for analyzing the timing of the stimulating pulses and said reflected waves to produce measurements of probe transit time periods;

means for measuring temperature to estimate the localized temperatures at a plurality of said probes;

means for calculating relative phase proportions based on the measurements of probe transit time periods and localized temperatures;

display means for displaying information indicating proportion measurements which accurately estimate the relative proportions of steam and water in the nuclear reactor at said plurality of probes.

18. A nuclear reactor water monitoring system according to claim 17 and further comprising:

means for analyzing measurements of relative phase proportions for a plurality of probes to provide an accurate quantitative estimate of total reactor inventory of water and steam.

19. A nuclear reactor water monitoring system according to claim 18 and further comprising:

means for recording a plurality of probe transit time periods occurring over time from the same probe;

means for identifying variations in the probe transit time periods over time; and means for deriving a measure of the variability of probe transit time periods over time to produce a measure of the level of turbulence experienced by the probe.

20. A method for quantitative measurement of the relative proportions of at least two dynamically variable, intermixed, non-segregated constituents within a vessel, the constituents having different permittivities; comprising:

positioning a plurality of relatively short electrically conductive probes within the vessel in a spaced probe array; said probes measuring at a plurality of distinct points within the vessel to determine the varying local proportions of the intermixed constituents at the plurality of distinct points;

generating time varying stimulating electrical signals;

transmitting said stimulating electrical signals along a conductor of known length;

detecting reflected electrical signals generated from the stimulating electrical signals;

measuring probe transmit times associated with travel of the stimulating electrical signals along known and fixed lengths of the plurality of probes;

measuring temperatures so as to provide estimated probe temperatures associated with the plurality of probes at times associated with measuring of the probe transit times for the plurality of different probes;

deriving accurate quantitative measurements of the relative proportions of the intermixed constituents for the plurality of probes based upon the probe transit times measured for the plurality of probes and measured temperatures for the plurality of probes.

21. A method according to claim 20 and further defined by the probe transit times being derived from a total round trip transit time to and from grounded points along said probes, less known round trip transit times to a first point along said probes.

22. A method incorporating the method of claim 20 for determining the total fluid inventory within said vessel and further comprising:

calculating total vessel inventory of the dynamically variable, intermixed, non-segregated constituents by utilizing information indicative of local probe relative proportions of said constituents for the plurality of probes and integrating said information into an accurate quantitative estimate of total vessel inventory.

23. A method incorporating the method of claim 20 for determining dynamic variability of the intermixed, non-segregated constituents and further comprising:

calculating the variability of individual probe transit time information over a plurality of probe transit time measurements to indicate the variability of the relative proportions of the intermixed constituents.

24. A method according to claim 20 wherein the step of deriving accurate quantitative measurements of the relative proportions of the intermixed constituents is accomplished by comparing data indicative of probe transit time periods for the plurality of probes against preprogrammed data associating probe transit time periods with relative proportions of intermixed constituents as a function of temperature.

25. A method according to claim 20 wherein the stimulating electrical signals substantially transit probe lengths between a first end and a grounded second end.

26. A system for quantitatively measuring fluid inventory within a vessel adapted for use in an environment where there are no gravitating force fields, conflicting force fields or varying force fields such that gaseous and liquid fluid phases contained within the vessel do not define a gas-liquid fluid level interface, and wherein the gaseous and liquid phases are intermixed and can vary in relative proportions from point to point within the vessel and over time; the system comprising:

a plurality of electrically conductive probes having first electrodes; the plurality of probes being arranged with the first electrodes extending within the vessel to communicate the fluid conditions adjacent the probe thereto;

at least one electronic pulse generator connected to supply stimulating pulses of electrical energy to and along said first electrode;

means for detecting reflected electrical waves generated by said stimulating pulses as a function of time;

computer means for analyzing the timing of stimulating pulses and said reflected waves to deduce measurements of probe transit times for the plurality of probes;

means for measuring temperature to estimate the localized temperature at the plurality of probes to provide probe temperature measurements;

means for comparing measured probe transit times and associated probe temperature measurements against predetermined data indicating relative proportion of the intermixed gaseous and liquid phases as a function of probe temperature and probe transit time to provide phase proportion readings which quantitatively indicate the relative proportions of the gaseous and liquid phases for the plurality of probes;

means for extrapolating from the phase proportion readings to generate a quantitative estimate of fluid and gaseous inventory within the vessel.

* * * * *